July 13, 1965  D. M. CAPLAN  3,194,705
METHOD AND APPARATUS FOR MAKING REINFORCED CORRUGATED HOSE
Original Filed Feb. 1, 1954  6 Sheets-Sheet 1
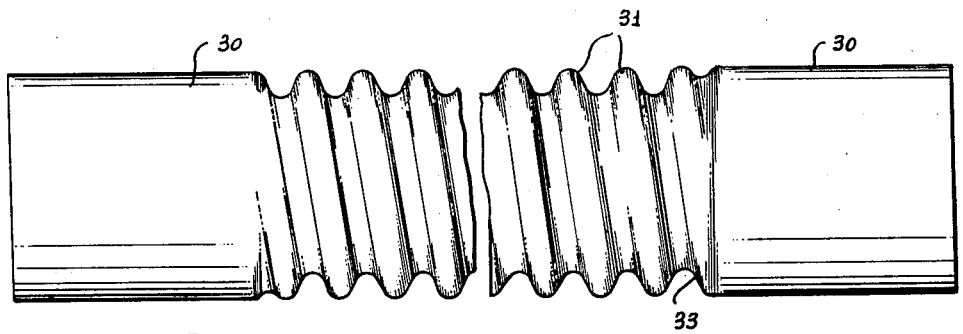
Fig. 1
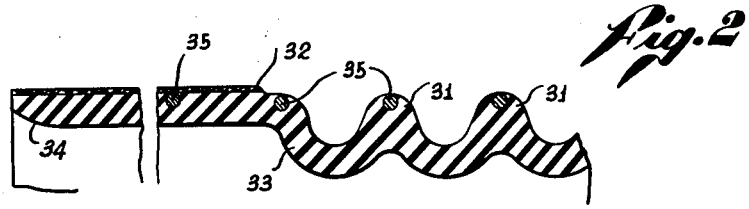
Fig. 2
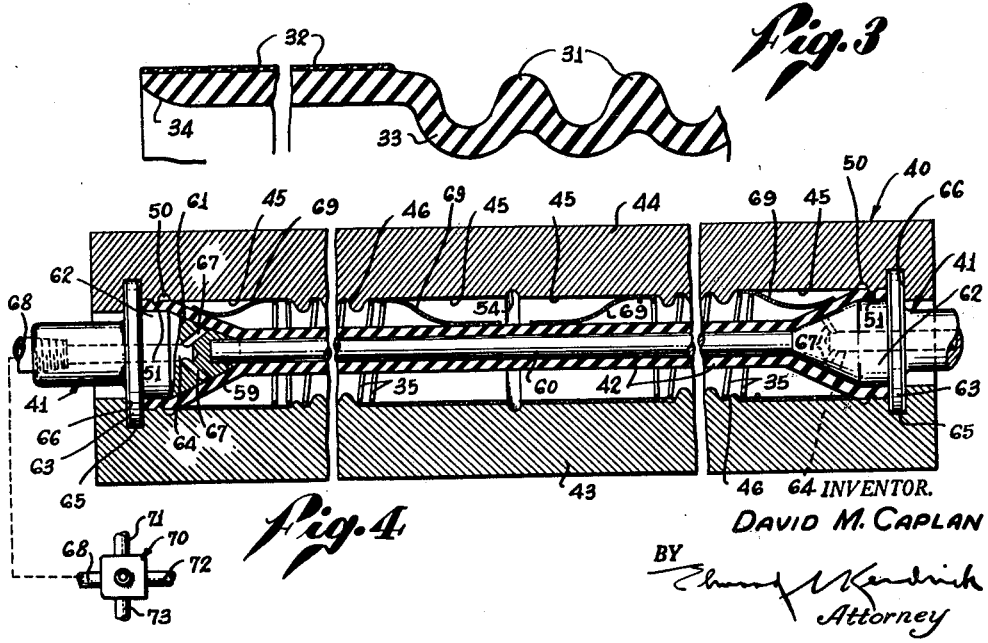
Fig. 3
Fig. 4
INVENTOR.
DAVID M. CAPLAN
BY
Attorney July 13, 1965           D. M. CAPLAN           3,194,705
METHOD AND APPARATUS FOR MAKING REINFORCED CORRUGATED HOSE
Original Filed Feb. 1, 1954           6 Sheets-Sheet 2
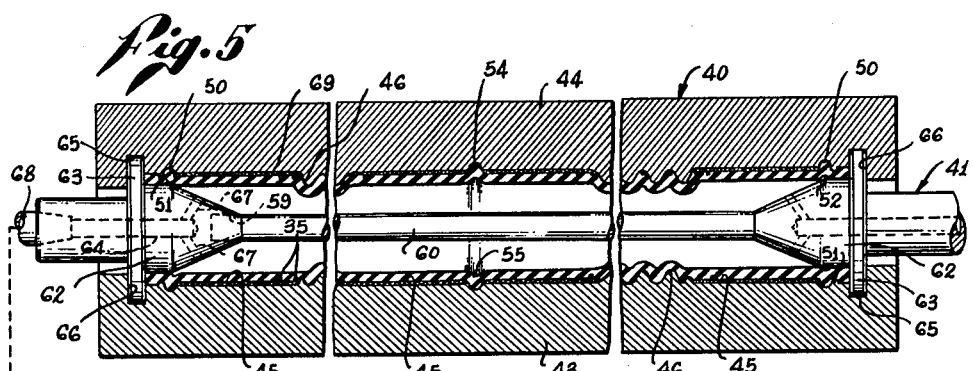
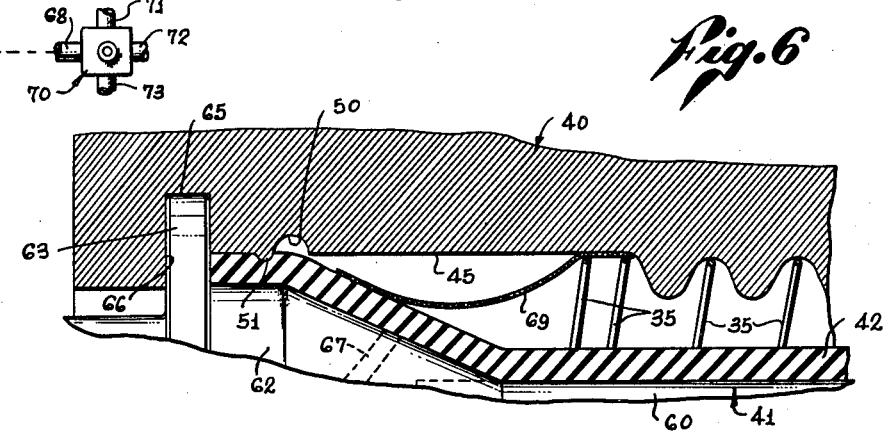
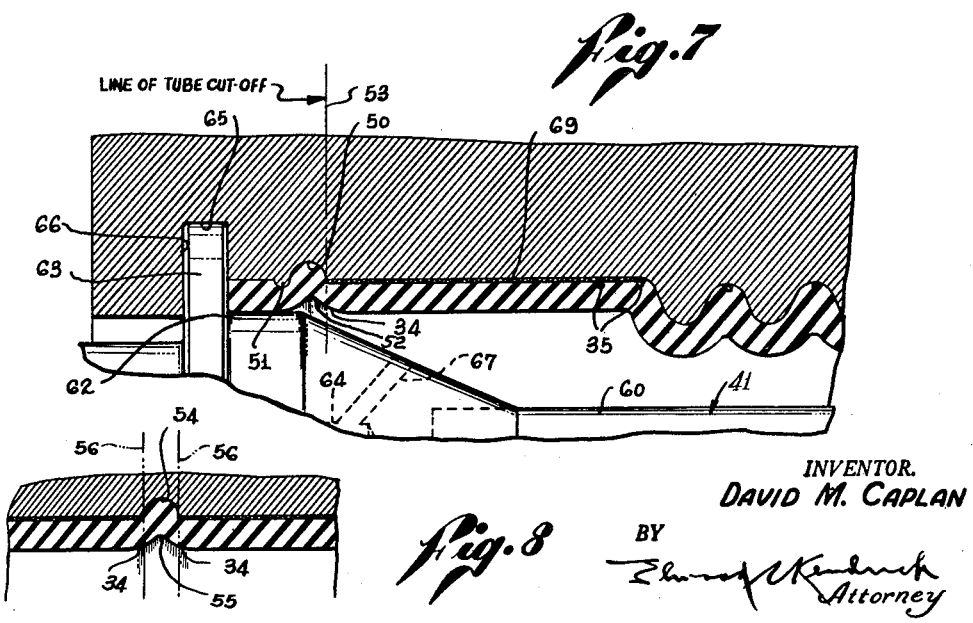
INVENTOR.
DAVID M. CAPLAN
BY
Attorney July 13, 1965 D. M. CAPLAN 3,194,705
METHOD AND APPARATUS FOR MAKING REINFORCED CORRUGATED HOSE
Original Filed Feb. 1, 1954 6 Sheets-Sheet 3
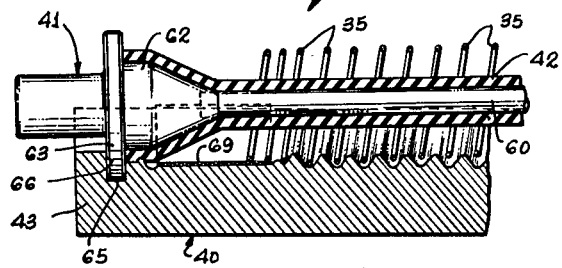
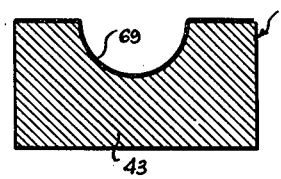
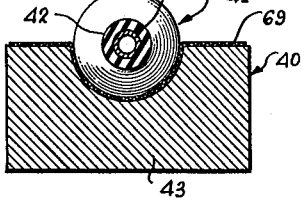
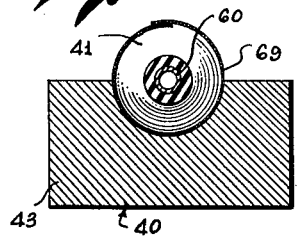
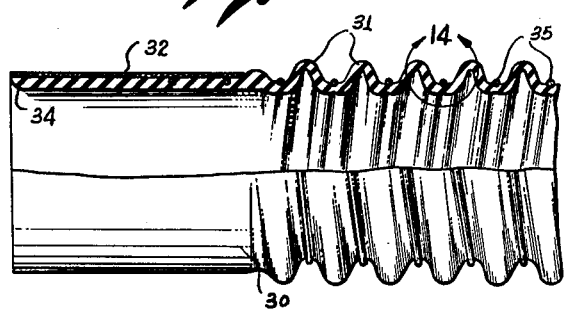
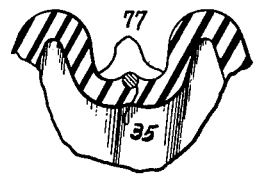
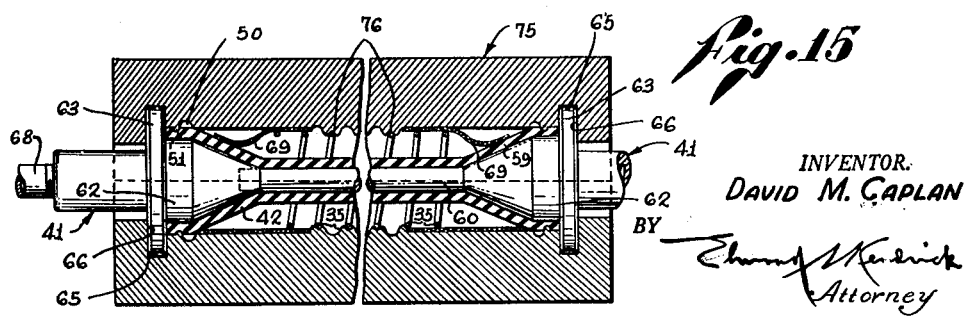
INVENTOR.
DAVID M. CAPLAN
BY
Attorney July 13, 1965 D. M. CAPLAN 3,194,705
METHOD AND APPARATUS FOR MAKING REINFORCED CORRUGATED HOSE
Original Filed Feb. 1, 1954 6 Sheets-Sheet 4

INVENTOR.
DAVID M. CAPLAN
BY
Attorney

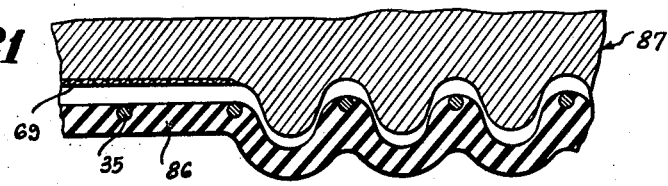
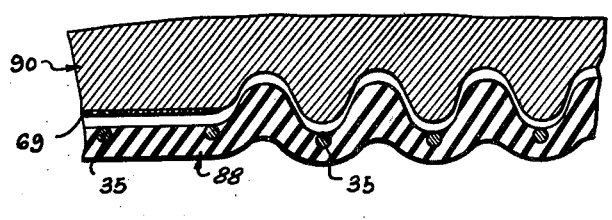
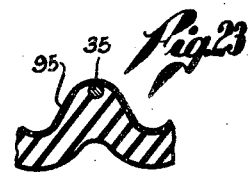
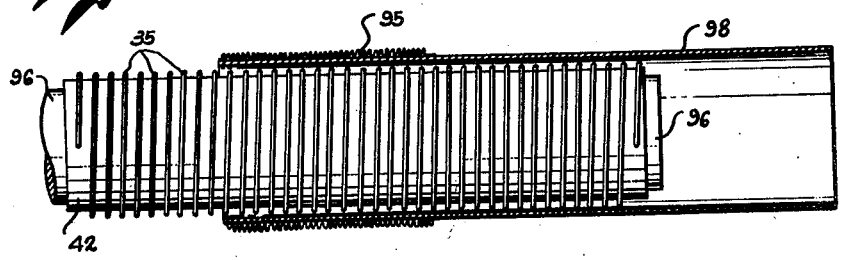
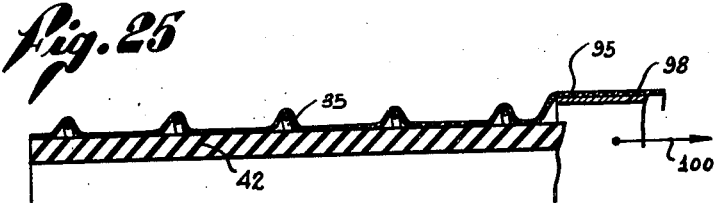
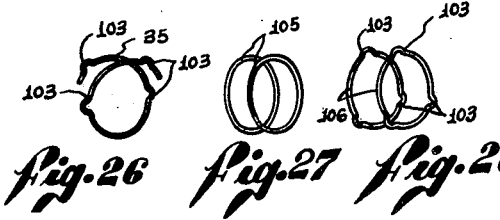
INVENTOR.
DAVID M. CAPLAN
BY
Attorney July 13, 1965 D. M. CAPLAN 3,194,705
METHOD AND APPARATUS FOR MAKING REINFORCED CORRUGATED HOSE
Original Filed Feb. 1, 1954 6 Sheets-Sheet 6
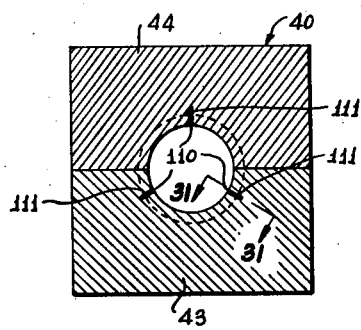
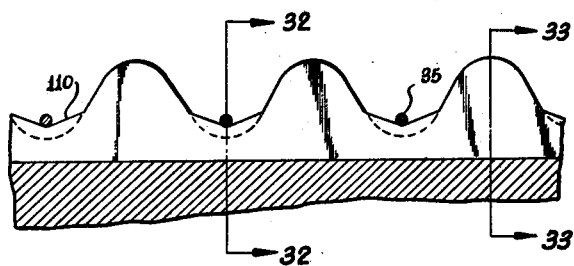
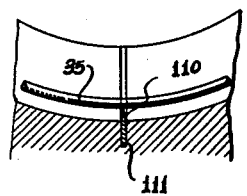
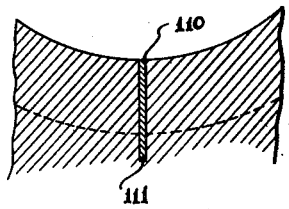
INVENTOR.
DAVID M. CAPLAN
BY
Attorney

3,194,705
METHOD AND APPARATUS FOR MAKING REINFORCED CORRUGATED HOSE
David M. Caplan, Los Angeles, Calif., assignor, by mesne assignments, to H. K. Porter Company, Inc., Pittsburgh, Pa., a corporation of Delaware
Original application Feb. 1, 1954, Ser. No. 407,248. Divided and this application Mar. 8, 1957, Ser. No. 644,841
17 Claims. (Cl. 156—143)

This invention relates to a method and apparatus for making flexible tubular conduits, including those made of thermosetting plastic materials, including natural rubber and other elastomers, as well as various synthetic resins and the like. While the method and apparatus of the invention are broadly applicable to conduits, they have special utility with reference to the manufacturing of radiator hose employed in the cooling systems of automotive vehicles and will be so described herein for the purpose of disclosure. Such a disclosure will provide adequate guidance for those skilled in the art who may have occasion to apply the same principles to other specific purposes.

The invention is directed more particularly to corrugated wall hose and is especially useful in making such hose embodying circumferentially disposed wire reinforcing means.

This application is a division of my copending application Serial No. 407,248, filed February 1, 1954, now abandoned, for Flexible Hose.

Prior to my invention various procedures and techniques had been suggested for the fabrication of this general type of radiator hose; but the practices found necessary for the production of high quality hose of this type were complicated, time consuming and sostly. Additionally, the hose thus produced were lacking in one or more desired characteristics. Among other diffculties, the prior practices did not lend themselves to the maintenance of uniformity in commercial production and this adversely affected not only the final product, but also economy of production.

The general object of the present invention is to provide improved method and apparatus for the efficient and economical production of a superior quality hose of this general character.

In general my invention contemplates a novel method employing the following fundamental steps and provision for novel apparatus for carrying out said method;

(1) Use a plastic material of the desired properties that is thermosetting and that will pass briefly through a fluid or semifluid stage, and hence thermoplastic stage, in the curing process and then set to a permanent configuration.

(2) Use such a thermoplastic setting material which in its precured state is yieldable and deformable and in addition is of such properties as will permit it to be molded, extruded or otherwise formed into an intermediate product of hollow configuration in preparation for the final molding and curing steps. In this instance, the intermediate product is an extruded tube of the uncured plastic of substantially less diameter than the final product. Various plastics that may be used include natural rubber and various other elastomers. Neoprene has been found highly suitable for meeting these first two requirements.

(3) Form the intermediate hollow product to the desired final shape by enclosing the intermediate product in a mold of the desired internal configuration, sealing off the interior of the intermediate product from the interior of the mold, and then introducing fluid under pressure into the intermediate product to expand it into intimate contact with the mold wall. In this instance, the preformed tube of uncured plastic is expanded radially to the desired dimensions and configuration.

(4) Apply curing heat primarily by using a heated pressurized fluid in direct contact with the plastic material so that the heat transfer or heat flow through the expanded material is radially outward from the inner surfaces of the material.

(5) Use steam for the heated pressurized fluid thereby to release a relatively large amount of heat for a given quantity of heating fluid. Heated compressed air provides relatively little heat per unit volume, whereas steam even steam under relatively low pressure, provides a relatively large number of B.t.u. by condensing to release its latent heat of vaporization. If heated air is used for the pressurized fluid, it is necessary to provide additional B.t.u. by heating the walls of the mold directly to produce a cure in a time interval sufficiently short for mass production; but steam inside the uncured product is capable of supplying a substantial part of the heat required for a cure, thereby reducing substantially the requirement for applying additional heat directly to the surrounding mold walls. Such reduction in the amount of heat applied directly to the surrounding mold walls is highly important, since if the mold walls are too hot, the outer surface of the uncured product in contact with the mold walls may be cured substantially faster than the remainder of the product and the proper flow of the product material may thereby be inhibited. It is especially important to avoid any such inhibition of proper flow of the product material when wire reinforcement members are used as described below. The use of steam has the further advantage of permitting close temperature control. A further consideration of primary importance is the fact that steam provides moisture as well as heat and the presence of the moisture shortens the curing period. There is some reason to believe, moreover, that a shortened curing period results in improving the quality of the final product.

That a method of fabrication in accord with the above five requirements results in superiority in the material per se is evident in the final product. An important fact is that the new product does not shrink during storage prior to sale.

Apart from the improvement in the properties of the cured plastic material per se, a further object of the invention is to provide a method and apparatus for making a corrugated hose of the present type that is superior in its construction and in the structural co-operation of its component parts. In this regard, one specific object is to provide a method and apparatus for making a hose having a peripheral surface that is exceptionally smooth to lessen the likelihood of damage by contact with sharp edges and abrasive surfaces; and a more important specific object is to produce a hose having walls which are corrugated with each successive corrugation substantially identical throughout its length. These specific objects are accomplished by care in the construction of the apparatus utilized in molding the uncured tube.

The importance of the uniformity of the corrugations is in the resulting wide distribution of bending stresses. In many instances, the hose is installed with a bend for change in direction and in practically all installations the hose is subjected to continual vibration. The present hose has the advantage of inherently seeking a long radius of curvature with the bending stresses distributed over a number of corrugations and with a minimum stress imposed on each individual corrugation. In contrast a corrugated hose made by conventional methods, being largely handmade, does not have uniform corrugations and consequently tends to crimp or bend sharply at its weakest corrugation. With the bending stresses concentrated in this manner, the weakest corrugation tends to fail by rapid fatigue of the material under prolonged vibration.

With further reference to structural advantages in the present hose, it is to be noted that the configuration of the individual corrugations may be closely determined by the configuration of the mold corrugations. In this regard, a feature of the invention is that the corrugations of the inner wall of the mold may be so shaped that the application of radially outward fluid pressure during the curing stage causes the temporarily fluid plastic material to flow selectively to build up the thickness of the hose wall locally at the crests of the hose corrugations. Thus the molding operation may be utilized to convert a simple uncured tube of uniform thickness into a corrugated body having circumferential or helical corrugations that are in effect thickened ribs for greater resistance to both internal and external pressure.

While the method and apparatus of this invention are useful in the production of a one-piece corrugated hose made of the thermosetting plastic with no added reinforcement whatsoever, an important feature of the invention is that it may be applied to the manufacture of a hose having reinforcement in the form of embedded circumferential turns of wire or the like or having suitable peripheral reinforcement. The term wire is to be understood as including solid elongated members that are non-circular in cross-sectional configuration, including flat bands. The term "peripheral reinforcement" is to be understood as including various sheet materials such as cured plastic sheets and tubes, as well as various fabrics and other fibrous materials. In the preferred practice of the invention the hose has both forms of reinforcement, peripheral sheet reinforcement at each end of the hose and embedded wire reinforcement extending through the intermediate length of the hose. To produce such a reinforced hose with improved structural co-operation between the plastic material and its reinforcement, two additional steps are required and in the presently preferred practice of the method these steps comprise:

(A) Place the wire reinforcement means inside the corrugated mold surrounding the uncured tube so that the tube will expand into pressure contact with the surrounding reinforcement when steam is admitted and as the cure proceeds the tube will be under maximum radial pressure to cause the plastic material to flow into intimate contact with the reinforcement material. Thus, as the plastic material passes through its critical fluid stage, the material flows around the turns of the encircling wire to embed the wire and also flows into intimate bond with the surrounding peripheral sheet reinforcement for intimate bond therewith.

(B) Use reinforcement material the surfaces of which are wettable by the plastic in the fluid stage of the cure. When the reinforcement material has an affinity for the plastic, the plastic seeks intimate bond with all the reinforcement surfaces to result in a high degree of unification of the plastic with the reinforcement. A wire reinforcement has the required surface characteristics if it is copper coated or if it is coated with suitable bonding material. Thus when the body of the hose is made of neoprene, the wire may be coated with an adhesive solution of neoprene or the like before the wire is placed in the mold. It has been found that precoating the peripheral sheet material at each end of the hose with uncured adhesive plastic affords the further advantage of permitting the peripheral sheet material to hold the encircling wire in place in preparation for the expansion and cure of the plastic by the admission of steam into the uncured tube.

In a prevailing method of manufacture employed prior to my invention to produce hose of this type, it is to be noted that the heat cure is carried out while the wire-encircled uncured tube is tightly wrapped both by spiral turns of fabric and by highly tensioned turns of cord lying on each side of each wire turn. Thus, during the fluid stage of the cure, the pressure of the fabric and of the cord tends to move the plastic material radially inward away from intimate contact with the encircling wire, whereas in the present method, the radially outward fluid pressure drives the fluid plastic material towards the encircling wire and since the pressurized fluid plastic material aggressively seeks to fill every available crevice in the mold, the plastic seeks bond with substantially the whole circumference of the wire. As a result, the reinforcement wire is substantially completely embedded in the cured plastic.

The invention also makes possible even deeper embedding of the wire. One procedure for this purpose involves the use of two corrugated molds. The first mold snugly embraces the wire and is used to produce a first stage corrugated hose as above described. Additional uncured plastic is then wound on to this first stage hose to build up its thickness over the embedded wire. Then the thickened hose is placed in a second corrugated mold for a second cure, the second mold being of appropriately larger diameter then the first mold.

An alternative procedure for the same purpose of deeply embedding the wire comprises drastically curtailing the steam treatment in the first mold so that the expanded plastic tube is partially cured, primarily in its inner circumferential region, sufficiently to maintain its expanded corrugated configuration with the wire at least partially embedded in the outer periphery of the plastic, and then the expanded partially cured product is transferred to the second larger mold without adding further plastic material. In the second mold, the steam pressure forces the partially cured plastic material radially outward beyond the circumference of the turns of the embedded wire, thus causing the wire to be embedded under a relatively thick peripheral layer of the plastic material.

A third procedure for achieving relatively deep placement of the wire in the plastic wall of the hose is to form radially outward offsets in the individual circumferential turns of the wire. Each of these outward projections of the wire serves as spacer means co-operative with the surrounding wall of the mold to space the major portion of the wire inward from the mold wall, thus permitting substantial thickness of the plastic to envelop the major portion of the wire.

The corrugations of the completed hose may be either helical or circular and, accordingly, the circumferential turns of the embedded wire may be either helical or circular. The turns of the wire reinforcement may be embedded in the crests of the hose corrugations or in the valleys of the hose corrugations, or in both the crests and the valleys.

An important advantage of embedding the wire reinforcement in the valleys of the hose corrugations is that such a construction lessens the degree to which the finished hose changes in length in response to changes in the pressure of a fluid confined by the hose. In some installations, such minimum change in length of the hose in response to change in internal pressure is highly desirable because the hose is bent to a curve close to adjacent devices of such character as to damage the hose material. For example, the hose may be installed with a bend adjacent a rotary fan or adjacent a hot surface and a change in length of the hose with consequent change in the radius of the bend may bring the hose into contact with such fan or hot surface.

A feature of the preferred practice of the invention is the shortening of the curing operation to the minimum by circulating fresh steam through the hollow expanded intermediate product continuously at substantial velocity in direct contact with the plastic material. The circulation of the steam not only continuously removes the condensate to make fresh steam available to the surfaces of the plastic, but also continuously removes the air that inevitably accompanies the steam. Air pockets and layers of air are prevented from forming to retard transfer of heat from the steam to the wall of the plastic tube. The fact that the continuous removal of films of condensate is important and the removal of air films even more important, may be appreciated when it is considered that a given thickness of condensate has sixty times the retarding effect on heat flow as the same thickness of cast iron and the same thickness of air has fifteen hundred times the retarding effect of cast iron. The use of actively circulating steam for the continuous removal of both condensate and air not only makes possible the desired flash heating effect, but also simultaneously provides the desired presence of moisture to shorten the curing operation. The additional fact that the steam is under pressure is highly important both because the application of pressure during the curing process increases the density of the plastic material and because the use of fluid pressure results in uniformly distributed pressure in all directions inside the material-confining mold. During the brief interval that the material under cure is fluid, the fluid pressure is uniform in all directions throughout the material with no tendency for the plastic material to flow between two regions of different pressures. During this period, all internal strains in the wall material are completely resolved. Such uniformity of pressure in all directions at the critical fluid stage in the curing operation is in contrast to the unevenness of pressure and the discontinuity of pressure areas that result from all attempts to pressurize the material mechanically by the prevalent wrapping and cording techniques heretofore mentioned. The fact that the steam is circulated through the tube to supply the curing heat is advantageous both for providing direct rapid application of heat to the plastic material and for permitting the cure to start at the inner circumferential surface of the expanded tube. In the above described conventional procedure the applied heat can reach the plastic material only by first passing through the external fabric and cord wrapping or through the metal walls of the mandrel.

Further objects of the invention are to reduce both the cost of material and the cost of labor in the manufacture of the hose and, in addition, to reduce the necessary investment cost. The attainment of all these further objects is inherent in the described process.

The saving in material lies in part in minimizing spoilage. Further savings in the preferred practice of the invention reside in avoiding the necessity of using fabric for the full length of the hose.

The saving in labor may be attained in part by substituting only a few operations for many operations, in part, by simplifying and shortening the individual operations, and, in part by using a cycle of fluid flow through the mold in which the flow of steam is followed by flow of water and/or compressed air for accelerated cooling that permits the apparatus to be used immediately for repeating the fabrication process. The greatly shortened curing cycle speeds up production to lower labor costs per unit, and further economies in labor costs may be achieved by molding multiple hose units in one operation.

Reduced investment cost follows from the fact that the equipment needed to carry out the simplified process is relatively inexpensive. A further fact reducing the cost of investment is that such simplification of the apparatus, together with the reduction in the number of operations, greatly reduces the floor space required for mass production.

A further object is to provide a simple, efficient, labor-saving apparatus for carrying out the above described fabrication procedures. In this regard, one advantage is that a corrugated mold may serve as a jig to hold the turns of wire-like reinforcement in position before and during the final cure. The valleys of the mold corrugations serve as positioning seats for the turns of the reinforcement in those instances in which the turns are to be embedded in the crests of the hose corrugations. If the turns are to be embedded in the valleys of the hose corrugations, the crests of the mold corrugations are modified to provide grooves to seat the reinforcement turns.

Further objects of the invention, with reference to the apparatus employed, include: to provide a combination in a mold assembly that will effectively seal off the interior of the uncured tube from the surrounding interior of the mold; to provide a mold assembly for molding a plurality of hose units in one operation; to provide a mold assembly including a mandrel for internal support of the whole length of the uncured tube to keep the tube from contacting the mold walls; and to provide a mold which makes contact with only the periphery of the uncured tube but nevertheless causes the interior of the tube to conform to a configuration providing a tapered entrance at the ends of the finished hose units.

The above and other objects, features and advantages of the invention will be apparent in the following detailed description considered with the accompanying drawings.

In the drawings, which are to be regarded as merely illustrative:

FIG. 1 is a side elevation of one embodiment of the invention as a radiator hose for use on automotive vehicles;

FIG. 2 is an enlarged longitudinal sectional detail of the hose showing wire reinforcement embedded therein;

FIG. 3 is a similar longitudinal section showing the same hose with the wire reinforcement omitted;

FIG. 4 is a longitudinal sectional view of a mold assembly with an uncured plastic tube mounted therein in preparation for the introduction of steam to expand and cure the tube;

FIG. 5 is a view similar to FIG. 4 showing the result of introducing the steam under pressure;

FIG. 6 is an enlarged sectional detail showing the end portion of the uncured tube prior to the introduction of the steam;

FIG. 7 is a similar view showing the result of the introduction of the steam under pressure;

FIG. 8 is a fragmentary sectional view showing a detail of the mold;

FIG. 9 is a fragmentary sectional view illustrating one procedure for placing the mandrel in the mold with distribution of the wire turns among the corrugations in the mold wall;

FIGS. 10, 11 and 12 are transverse sectional views illustrating one procedure for encircling the ends of the hose with fabric;

FIG. 13 is a view partly in side elevation and partly in longitudinal section illustrating another embodiment of the invention as a radiator hose;

FIG. 14 is an enlarged detail taken as indicated by the circular arrow 14 in FIG. 13;

FIG. 15 is a longitudinal sectional view of a mold assembly that may be used to produce the hose shown in FIGS. 13 and 14;

FIG. 21 is an enlarged longitudinal sectional detail illustrating one stage in another fabrication procedure that may be used to produce the hose shown in FIG. 16;

FIG. 22 is an enlarged longitudinal sectional detail illustrating one stage in a similar fabrication procedure that may be used to produce the hose shown in FIG. 18;

FIG. 23 is an enlarged fragmentary detail illustrating a further embodiment of the invention as a radiator hose;

FIG. 24 is a view partly in side elevation and partly in section, showing one stage in a procedure for fabricating the hose shown in FIG. 23;

FIG. 25 is a fragmentary longitudinal sectional view showing a second stage in the procedure for fabricating the hose shown in FIG. 23;

FIGS. 26, 27 and 28 are perspective views showing forms of wire reinforcement that may be employed in various practices of the invention;

FIG. 29 is an enlarged transverse sectional view of a portion of hose incorporating a wire reinforcement such as shown in FIGS. 26 and 28;

FIG. 30 is a cross-sectional view of a modified form of mold that may be used in one practice of the invention;

FIG. 31 is an enlarged section taken along the line 31—31 of FIG. 30; and

Figure 16:
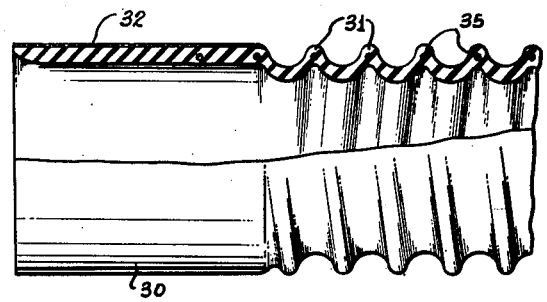
FIG. 16 is a view partly in side elevation and partly in longitudinal section showing another embodiment of the invention as a radiator hose.

FIGS. 32 and 33 are sections taken along the lines 32—32, and 33—33, respectively of FIG. 31.

FIG. 1 shows a selected embodiment of the invention as a radiator hose for automotive vehicles. The hose has two plain cylindrical ends 30 and a major intermediate portion formed with helical corrugations 31. As shown in FIG. 2, each of the cylindrical ends 30 is peripherally reinforced by sheet material, in this instance a fabric sleeve 32 which is unified with the rubber-like body 33 of the hose and each of the ends has a rounded internal taper 34. The purpose of the taper 34 is to facilitate the task of telescoping the end of the hose over a tubular member as required in the installation of the hose for service. Preferably the main intermediate longitudinal portion of the hose is reinforced by a wire reinforcement means 35. In this instance, the reinforcement means 35 is a helical coil of wire having its turns embedded in the crests of the helical corrugations 31. It will be noted that the helical coil of wire is continued into each of the two hose ends 30. FIG. 3 illustrates the fact that the wire reinforcement means 35 may be omitted in some practices of the invention.

The rubber-like body 33 of the hose may be made of any suitable elastomer, including natural rubber, which is capable of being folded into a tube in its uncured state. Neoprene has been found highly satisfactory for this purpose, but various other rubber-like materials may be used.

The apparatus for carrying out the method of the invention may comprise a mold assembly shown in FIG. 4 which is a combination of a mold, generally designated 40, and a mandrel, generally designated 41, which co-operate for the processing of a suitably shaped and dimensioned uncured tube 42 of the thermosetting plastic material.

The hollow mold 40 is split longitudinally into two separable sections comprising a lower section 43 and an upper section 44 which may be held together in any well known manner for the purpose of carrying out a molding operation with appreciable internal fluid pressure. For example, a number of the assembled molds may be placed in a suitable press for simultaneous processing of a plurality of the uncured tubes 42. In this instance, the mold 40 is relatively long so that it may be used to mold a relatively long uncured tube 42 to form a series of integrally interconnected hose units in one operation. Accordingly, the interior wall of the mold is formed with a number of cylindrical portions 45 corresponding to the ends 30 of the hose units and is formed with an alternate series of circumferentially corrugated portions 46 corresponding to the intermediate corrugated portions of the hose units.

As best shown in FIGS. 6 and 7, the inner cylindrical portion 45 at each end of the mold 40 terminates adjacent a circumferential recess 50 in the mold wall and the recess in turn is adjacent a circumferential rib 51 in the mold wall. The purpose of the rib 51 is to co-operate with the mandrel 41 for the purpose of sealing off the interior of the uncured tube 42 from the surrounding interior of the mold 40. The purpose of the circumferential recess 50 is to form a circumferential pocket into which the material of the uncured tube 42 may flow and by such outward displacement form an inner circumferential groove 52 (FIG. 7) in the wall of the molded product. It will be noted that the circumferential groove 52 formed in this manner has inclined side walls so that when the finished product is cut transversely on the line 53 in FIG. 7, the result is a hose end having the desired entrance taper 34.

At intermediate points along the length of the mold 40 where two of the cylindrical portions 45 of the inner mold wall are adjacent to each other, a recess 54, similar to the recess 50, is formed circumferentially in the mold wall for the same purpose. Thus, as indicated in FIG. 8, in this region where two adjacent hose units in the molded product are interconnected end to end, the plastic material of the uncured tube 42 flows into the recess 54 to form an internal circumferential groove 55 in the molded product. The internal groove 55 has inclined side walls so that the molded product may be cut transversely along two lines 56 to form two hose ends having the desired entrance tapers 34.

The mandrel 41 is preferably adapted to serve a number of different functions. It serves, of course, as means for circulating steam under pressure through the plastic tube 42; it co-operates with the surrounding mold 40 to seal off the interior of the plastic tube from the interior of the mold; it serves as means for preparatory handling of the uncured tube 42 and for expeditiously positioning the uncured tube in the mold; and it serves as means to prevent the uncured tube 42 from sagging into contact with the surrounding mold. Preventing such sag avoids any possibility of the wall of the plastic tube being weakened locally by the inadvertent contact with a heated mold surface prior to the introduction of steam. Obviously, the mandrel 41 may be constructed in various ways to serve any number of these various purposes.

In the present construction, the mandrel 41 has a relatively long intermediate portion 60 and has two enlarged ends, each of the ends having a conical portion 61, a short enlarged cylindrical portion 62, and a radial flange 63. The purpose of the conical portion 61 is to flare the end of the uncured plastic tube 42 to the diameter of the enlarged cylindrical portion 62 of the mandrel and the purpose of the enlarged cylindrical portion is to co-operate with the surrounding circumferential rib 51 of the mold 40 for the purpose of sealing off the interior of the plastic tube from the surrounding interior of the mold.

It is contemplated that the mandrel 41 will be made in two separable sections to permit the mandrel to be inserted into a plastic tube 42. In this instance, for example, one of the enlarged ends of the mandrel is a separate piece with an inner blind bore 59 dimensioned to telescope onto the intermediate portion 60. Thus, with the two sections of the mandrel separated, the intermediate portion 60 of the mandrel may be inserted through an uncured plastic tube 42 and then the two mandrel sections may be assembled together as shown in FIG. 4. It will be noted in FIG. 4 that when the two sections of the mandrel are assembled together and the mandrel is placed inside the mold 40, the two radial flanges 63 at the two ends of the mandrel seat into complementary circumferential grooves 65 in the wall of the mold 40 whereby the mold serves as means to keep the two sections of the mandrel from separating in response to internal fluid pressure. Any tendency of the two mandrel sections to move apart longitudinally is prevented by the fact that each of the radial flanges 63 serves as radial shoulder in abutment against a co-operating radial shoulder 66 formed in the mold.

The mandrel 41 is constructed to admit fluid for expansion of the uncured tube and has inlet and outlet ports to permit the fluid to circulate through the mandrel and plastic tube. To provide such inlet and outlet ports, each of the enlarged ends of the mandrel may have a short axial bore 64 and at least one inclined bore 67 extending from the axial bore to the surface of the conical portion 61 of the enlarged end. At least one of the enlarged ends of the mandrel is internally threaded at the entrance to the corresponding axial bore 64 for connection with an input pipe 68 from a suitable supply of steam and, if desired, the other end of the mandrel may be similarly threaded for connection with a return line. It is a practical matter, however, to have the outlet side of the mandrel discharge into the atmosphere, the outlet of the mandrel being suitably restricted to cause any desired degree of pressure to build up inside the mold.

The manner in which the fabrication of the hose may be accomplished with the described apparatus may be readily understood by reference to the drawings. In a typical procedure, the two sections of the mandrel 41 are separated to permit the tubular portion 60 to be inserted through an uncured plastic tube 42. The helical coil of reinforcement wire 35 is then loosely slipped over the uncured plastic tube 42 and the two sections of the mandrel are assembled together with the plastic tube flared at each end and terminating at each end adjacent the radial mandrel flange 63. With the upper section 44 of the mold removed, a suitable strip of fabric 69 is laid across each of the plain cylindrical portions 45 of the lower mold section 43, as shown in cross-section in FIG. 10. Each of these fabric strips 69 forms the material of the previously mentioned fabric sleeve 32 on each end of a finished hose unit. The fabric strips 69 are coated on one side with a suitable adhesive, the adhesive side being uppermost in FIG. 10. In this instance, the adhesive coating may be a suitably tacky solution of the same uncured thermosetting plastic that is used for the uncured tube 42.

With the various fabric strips 69 in position in the lower half of the mold, the mandrel 41 is seated in the lower section 43 of the mold with one or two of the end turns of the wire reinforcement 35 for each hose section resting on each of the adhesive fabric strips and with the intermediate turns of the wire reinforcement seated in the valleys formed by the internal circumferential corrugations of the mold.

In the particular procedure illustrated by FIG. 9, one end of the mandrel 41 is first placed in the lower mold section 43, with the radial flange 63 at the end of the mandrel seated in the corresponding circumferential groove 65 in the mold wall and with the other end of the mandrel slightly elevated to hold the mandrel in inclined position as shown. It is a simple matter to distribute the turns of the wire reinforcement 35 among the valleys of the mold corrugations beginning at one end of the wire coil as indicated in FIG. 9. In this manner, the mandrel is brought to a final position in the lower section 43 of the mold with as many of the wire reinforcement coils seated in the mold as the number of end-to-end hose units that are to be formed in one molding operation.

At this point in the procedure the fabric strips 69 cradle various portions of the plastic tube and wire reinforcement, and the next step is to bring the two ends of the fabric strips together, as may be understood by referring to FIGS. 11 and 12. At each end of the mandrel, the fabric strips 69 encircle one or two end turns of the wire 35 and sag onto the conically flared ends of the plastic tube 42 as shown in FIG. 6. At the end-to-end junctures of the hose units, the fabric strips 69 in like manner encircle one or two end turns of the corresponding wire coils and sag onto the plastic tube 42 as shown in FIG. 4. With the mold 40 closed and the two mold sections securely held together to withstand internal fluid pressure, the uncured plastic tube 42, together with the various coils of the reinforcement wire 35 and the various strips of fabric 69 are positioned as shown in FIG. 4.

The steam is now introduced into the mandrel 41 through the supply line 68 to fill the interior of the plastic tube 42 and to cause the plastic tube to expand radially outward against the various strips of fabric 69 and against the various coils of wire 35. This radial expansion of the plastic tube 42 is uniform by virtue of the fact that the plastic tube is of uniform thickness and by virtue of the further fact that the fluid pressure of the introduced steam acts uniformly in all directions. As the steam expands the plastic tube 42, it transmits heat rapidly to the tube to start the curing process and because of the rapid circulation of the steam through the length of the mold, the curing process starts in a practically simultaneous or instantaneous manner throughout the length of the plastic tube. While the fluid pressure of the steam is pressing the plastic tube 42 radially outward against the fabric, against the wire and against the mold walls, the heating of the plastic material by the steam causes the plastic to enter the temporary fluid or semifluid state that is characteristic of the curing process. The fluid or semifluid plastic material takes on the uniform fluid pressure of the steam and is thereby forced outward to seek aggressively to enter and completely fill every available crevice inside the mold. In this manner, the plastic material penetrates the interstices of the fabric strips 69 to completely impregnate the fabric and the plastic material likewise flows around the turns of the wire reinforcement 35.

It is contemplated that the surface of the wire reinforcement 35 will be copper coated or will be coated with an adhesive layer of the uncured plastic material or otherwise be treated so that there will be a certain affinity for the surface of the wire on the part of the fluid plastic material. With the wire surface highly wettable with respect to the fluid plastic material, the plastic material readily flows around the outer surfaces of the wire coil to embed the wire coil and an exceptionally intimate bond is established between the wire and the plastic material.

At the beginning of the heat treatment by the introduced steam, the wall of the uncured plastic tube 42 is under a substantial degree of tensile stress but when the stretched plastic material enters the fluid stage, all of the internal strains in the tubular body of plastic material are resolved. The helical corrugations of the interior mold wall have a certain desirable selective effect with respect to the flow of the plastic material, since the plastic material under the radially outward fluid pressure tends to fill the valleys between the mold corrugations. As a result the radial thickness of the plastic body 33 of the hose is increased at each of the crests of the external corrugations of the finished product. Thus, each of the finished hoses is thickened radially at each corrugation crest so that each crest serves as a reinforcing rib. The embedded turns of the reinforcement wire 35 in each of the corrugation crests of the hose add further strength to the final product.

At the completion of the brief curing process, the mold and the associated mandrel are dismantled to release the molded tubular hose. The tubular hose is then cut transversely as indicated by the radial line 53 in FIG. 7 and the radial lines 56 in FIG. 8 to break the molded tubular product into separate hose units of the configuration shown in FIG. 1.

In the process just described, the product is completely cured in the mold. If desired, however, the hose may remain in the mold only long enough to take the desired final shape and then the semi-cured hose may be removed and the cure may be completed in another means such as an autoclave.

A feature of the preferred practice of the invention is the provision for the flow of a cooling fluid such as water or air through the mandrel 41 immediately after the steam curing step to cool the molded product and especially to cool the mandrel. Unless the mandrel is cool at the start of a new production cycle, the mandrel will heat the newly mounted uncured plastic tube and the weight of the tube will cause the upper wall of the tube to be softened more than the rest of the tube. Consequently the upper wall of the tube will thin out when the tube is subsequently expanded. The cooling of the mandrel by circulating fluid at the end of a production cycle makes it possible to start the next production cycle without loss of time.

To provide for such circulation, FIGS. 4 and 5 show by way of example the input pipe 68 connected to a multiple-position valve 70. At a first position in a preferred cycle of fluid flow the valve 70 cuts off the input pipe 68 to permit assembly of the mold; at the next position it admits steam to the input pipe from a steam line 71; at the next position in the fluid cycle the valve cuts off the steam line and admits water to the input pipe from a water line 72 to flow through the mandrel and cool both the mandrel and the molded product; at the final position of the valve in the fluid cycle it cuts off the water line and admits compressed air to the input pipe from an air line 73 to blow the water out of the mandrel and for further cooling of the mandrel. This fluid cycle may be shortened by omitting either the flow of water or the flow of air.

The purpose of FIGS. 6, 7 and 8 is to illustrate clearly the manner in which the plastic material enters the circumferential recesses 50 and 54 in the mold walls, and to illustrate the manner in which the fabric strips 69 are expanded against the mold by steam pressure inside the plastic tube. It will be noted that in each instance the fabric strip 69 terminates closely adjacent the associated mold recess 50 or 54.

FIGS. 13 and 14 show the construction of a second embodiment of the invention in which the reinforcement wire 35 is embedded in the valleys of the hose corrugations instead of being embedded in the crests. FIG. 15 shows the construction of a mold assembly that may be used to produce such a hose. Except for the fact that the wire reinforcement is in the valleys of the corrugations, the hose shown in FIG. 13 is largely identical to the first described hose shown in FIGS. 1 to 3, as indicated by the use of corresponding numerals to indicate corresponding parts. The mandrel 41 in FIG. 15 is unchanged and the mold, generally designated 75, is largely identical with the first described mold except for the fact that the internal corrugations of the mold 75 have small grooves 76 formed in the crests of the corrugations to serve as seats for the turns of the wire reinforcement 35. The operations for fabricating this second form of the hose are the same as heretofore described except for the care taken to seat the turns of the wire reinforcement in the mold grooves 76.

Preferably in this second practice of the invention, the corrugations in the mold walls are such as to cause the plastic material to be slightly thinned out in the valleys of the hose corrugations on each side of each turn of the wire reinforcement 35. FIG. 14 shows the thickness of the wall of the hose slightly reduced at the two points 77 in each valley on opposite sides of the embedded wire reinforcement 35. Thus, the finished hose is characterized by the provision of circumferential flexure zones or zones of minimum resistance to bending, these zones being positioned on each side of each turn of the embedded wire.

While the two procedures just described result in embedding the wire reinforcement 35 in the plastic material of the hose wall in a thoroughly satisfactory manner, it may be desired in some instances to have the wire reinforcement embedded still deeper in the wall of the tube. FIG. 16, for example, shows the wire reinforcement 35 embedded in the crests of the hose corrugations approximately halfway between the inner and outer surfaces of the hose.

Figure 17:
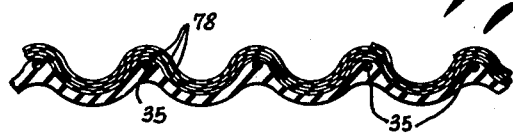
FIG. 17 is a fragmentary longitudinal section illustrating one stage in a procedure for fabricating the hose shown in FIG. 16.

One method for the fabrication of a hose with deeply embedded wire as shown in FIG. 16 includes the following steps. First, an uncured plastic tube 42 is processed with steam pressure in the manner illustrated by FIGS. 4 and 5, but in this instance, the fabric strips 69 are omitted. The result is an intermediate product in the form of a plastic hose of corrugated configuration with the turns of the wire reinforcement embedded in the crests of the configuration. Thus, the intermediate product is of the construction shown in FIG. 2 with the fabric sleeve 32 omitted. The resulting intermediate cured plastic product is then increased in thickness by wrapping a thin strip 78 of uncured plastic material around its periphery as shown in FIG. 17. The uncured plastic strip 78 may be of a width corresponding to four of the corrugations of the intermediate product and may be wrapped spirally in several layers to build up the thickness of the tube wall. The added plastic material also increases the thickness of the cylindrical ends of the hose where the end turns of the wire reinforcement are embedded in the cylindrical ends by the initial molding operation. Fabric strips 69 are placed on the ends of the built-up intermediate product and then the intermediate product is placed in a second mold of sufficiently large diameter to accommodate the added uncured plastic material. In this second mold, the steam treatment is repeated to expand the material of the thickened tube against the surrounding mold walls and to cure the added layers of material.

The steam pressure employed in the various procedures disclosed herein will ordinarily range between 10 pounds and 100 pounds gauge pressure, but higher and lower pressures may be employed if desired. It is contemplated that more often than not the steam pressure will be on the order of 50 to 100 pounds gauge. When a built-up intermediate product is processed in a second mold as just described, the steam pressure will usually be increased and may be, for example, on the order of 100 pounds per square inch gauge pressure.

Figure 18:
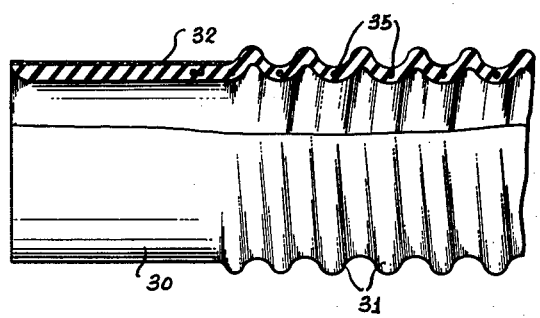
FIG. 18 is a view, partly in side elevation and partly in longitudinal section of another embodiment of the invention as a radiator hose.
Figure 19:
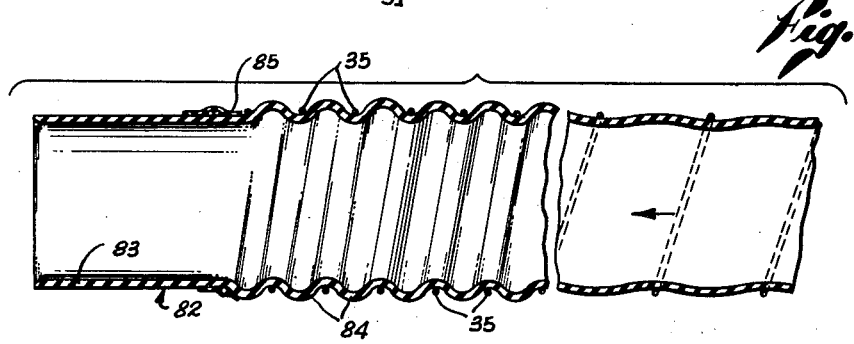
FIG. 19 is a longitudinal sectional view illustrating one stage in a procedure for fabricating the hose shown in FIG. 18.

FIG. 18 shows another embodiment of the invention which is somewhat similar to the hose shown in FIG. 13, but differs in having the wire reinforcement 35 buried deeper in the valleys of the hose. The procedure for fabricating the hose shown in FIG. 18 may be as follows. First, a tube 42 of the uncured plastic is steam-processed in a corrugated mold in the manner illustrated by FIGS. 4 and 5, but in this instance, both the fabric strips 69 and the coils of wire reinforcement 35 are omitted. The result in a thin-walled intermediate product, generally designated 82 in FIG. 19, which has cylindrical end portions 83 and has a major intermediate portion with corrugations 84. The next step is to place a coil of the reinforcement wire 35 around this intermediate product with the turns of the wire reinforcement resting snugly in the valleys formed by the corrugations 84.

Since the diameter of the helical turns of the wire reinforcement 35 is less than the diameter of the crests of the hose corrugations 84, a certain problem arises as to how to telescope the coiled wire onto the intermediate product 82. This problem is solved by stretching the corrugated intermediate product longitudinally as indicated at the right in FIG. 19, thereby stretching out the corrugations 84 to lessen the overall diameter sufficiently to permit the turns of wire 35 to be slipped over the corrugation crests. The end turns of the wire reinforcement 35 may be bonded in place by small adhesive strips 85 of the uncured plastic material as indicated on the left in FIG. 19.

Figure 20:
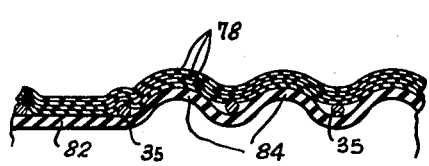
FIG. 20 is an enlarged longitudinal sectional detail illustrating a later stage in the fabrication of the hose shown in FIG. 18.

The next step is to build up the thickness of the wall of the intermediate product 82 by winding thereon several layers of the previously mentioned thin strip 78 of uncured plastic material, as shown in FIG. 20. The added material builds up the thickness of the corrugated portion of the intermediate product to cover the turns of wire reinforcement 35 and also builds up the thickness of the cylindrical ends 83 of the intermediate product. The previously mentioned fabric strips 69 are then added to the cylindrical ends 83 and the built-up intermediate product 82 is placed in a second corrugated mold similar to the first mold but of sufficiently larger diameter to accommodate the added uncured plastic. The built-up intermediate product is then processed by steam in the second mold to expand the wall material against the mold and to cure the added thickness of material.

Another procedure that may be followed to fabricate the hose shown in FIG. 16 with the wire reinforcement 35 deeply buried in the crests of the hose corrugations, includes the following steps. First, an uncured plastic tube 42 is placed in a mold and processed as indicated by FIGS. 4 and 5, but in this instance, the fabric strips 69 are omitted. In carrying out this step, however, the steam treatment is greatly curtailed, the heat partially curing the expanded tube 42 primarily in its inner circumferential region and only to sufficient extent to cause the tube to maintain its expanded corrugated configuration with the turns of wire reinforcement 35 at least partially embedded in the corrugation crests. As indicated in FIG. 21, this partially cured intermediate product 86 is then placed in a larger mold 87. Fabric strips 69 are added at the end portions of the hose. Steam is then introduced into the second mold 87 to expand the partially cured intermediate product 86 to the full inside diameter of the mold and into intimate bonding contact with the fabric strip 69. Since the helical turns of the reinforcement wire 35 are of substantially smaller diameter than the valleys of the mold corrugations, the turns of wire remain spaced from the mold valleys, and the partially cured tube expands radially outward beyond the turns of wire thereby effectively burying the turns of wire under substantial thickness of the plastic material. The second steam process is prolonged sufficiently to accomplish a final cure with the hose at the larger diameter of the second mold.

The hose shown in FIG. 18 with the turns of wire reinforcement 35 deeply buried in the valleys of the hose corrugations may also be fabricated by a procedure similar to that just described. Thus, an uncured plastic tube 42 may be placed in a mold as shown in FIG. 15 with the turns of the wire reinforcement 35 in the grooves 76 in the crests of the mold corrugations. The fabric strips 69 are omitted. Here again, steam is introduced for a period of time sufficient merely to partially cure the expanded plastic tube primarily in the inner circumferential region of the tube with the turns of the wire reinforcement 35 at least partially embedded in the valleys of the hose corrugations. As shown in FIG. 22, the partially cured intermediate product 88 is then placed in a mold 90 of larger inside diameter and fabric strips 69 are also placed in the mold to form sleeves at the ends of the finished hose. Steam is then introduced into the second mold 90 to expand the partially cured intermediate product 88 to the full inside diameter of the mold and to complete the cure of the plastic material. Since the turns of the wire reinforcement 35 are of less diameter than the corrugation crests of the mold, the plastic material in the final curing stage flows radially outward beyond the turns of the wire thereby embedding the wire under substantial thickness of the plastic in the final product.

FIG. 23 shows the structure of a radiator hose which is, for the most part, similar to the hose shown in FIGS. 1 and 2, but differs therefrom in the addition of a peripheral layer of sheet material in the form of fabric 95 constituting a sleeve covering the entire length of the hose. The procedure for fabricating the hose shown in FIG. 23 may be as follows.

First, an uncured tube 42 of the plastic material is placed on a suitably dimensioned cylindrical mandrel 96 in the manner indicated in FIG. 24 and then a helical coil of the reinforcement wire 35 is placed around the uncured tube as shown. The peripheral fabric 95 in the form of an elastic woven fabric sleeve or stockinette is placed on a larger hollow cylindrical mandrel 98, with the stockinette 95 crowded or bunched at one end of the mandrel as shown in FIG. 24. The larger mandrel 98 carrying the woven sleeve 95 is then telescoped over the mandrel 96 carrying the uncured plastic tube 42 together with the wire 35 and then the resilient fabric sleeve 95 is progressively shifted onto the plastic tube 42 to cover the surrounding reinforcement wire 35 in the manner indicated in FIG. 25. In the course of this operation, the outer cylindrical mandrel 98 is progressively shifted relative to the plastic tube 42 as indicated by the arrow 100 in FIG. 25. The uncured plastic tube 42, with the wire 35 and the fabric sleeve 95 mounted thereon is placed in a mold in the manner indicated in FIG. 4 and fabric strips 69 are placed in the mold to form the reinforcing fabric sleeves 32 at the two ends of the finished hose. Steam is then introduced in the manner heretofore described to expand the uncured plastic tube 42 in the manner shown in FIG. 5, to produce the final product illustrated by FIG. 23.

FIGS. 26, 27 and 28 show various forms that the wire reinforcement 35 may take in various practices of the invention. In the form shown in FIG. 26, the wire reinforcement 35 is in the form of a helical coil and the wire is further formed with small radial offsets 103. There may be, for example, three such offsets for each circumferential turn of the wire 35. FIG. 27 shows turns of the wire reinforcement 35 in the form of a series of circular circumferential rings as distinguished from helical convolutions. The rings 105 may be embedded in the crests of the hose corrugations, or in the valleys of the hose corrguations, or in both the crests and the valleys, FIG. 28 shows the turns of the wire reinforcement 35 in the form of a similar series of circular rings 106, which rings are further formed with the previously mentioned radial offsets 103.

When the turns of the reinforcement 35 are formed with radial offsets 103, the offsets contact the inner circumferential surface of the mold used in the steam process and thus serve as spacing means to maintain the major portion of the wire reinforcement at relatively great depth in the plastic material during the final curing stage. As a result, the radial offsets 103 extend to the periphery of the hose wall as indicated by the sectional view in FIG. 29, but the major portion of the wire reinforcement is embedded relatively deeply in the plastic wall of the hose. FIG. 29 shows that the reinforcement is also liberally spaced radially outward from the inner surface of the hose. Thus the radial offsets 103 serve as means to space the major portion of the wire reinforcement away from both the inner and the outer surfaces of the hose.

FIGS. 30–33 indicate how the mold 40 of FIGS. 4–9 may be modified to mold in one operation the hose shown in FIG. 6. The wire reinforcement 35 is relatively deeply embedded in the crests of the hose corrugations.

The modification of the mold consists in adding three longitudinal blade-like inserts 110 inside the mold, the inserts being spaced apart approximately 120°. A longitudinal slot 111 is milled in the inner circumferential wall of the mold to seat each blade-like insert 110. Each insert completely fills the slot 111 in the region of each of the crests of the mold corrugations, as indicated in FIG. 33, and conforms to the sloping sides of each crest but spans the valley between each mold crest to serve as means to space the wire reinforcement 35 radially inward from the bottom of each valley. Preferably the blade-like insert 110 is slightly cut away at each valley to form a shallow V-shaped seat to center the wire reinforcement as may be seen in FIG. 31.

Since the three inserts space the turns of the wire reinforcement inward from the bottoms of the mold valleys, the turns of the wire reinforcement are embedded deep in each crest of the finished hose. The exposed edges of the knife-like insert 110 form corresponding incisions in the crests of the hose corrugations, but such incisions are unnoticeable and insignificant.

My description in detail of various specific practices of the invention will suggest to those skilled in the art various changes, substitutions and other departures from my disclosure that properly lie within the spirit and scope of the appended claims.

What is claimed is:

1. A method of fabricating a hose of thermosetting plastic material with circumferential turns of wire reinforcement means embedded therein, characterized by the use of a hollow mold with a helically corrugated interior circumferential wall and including the steps of: placing a tube of thermosetting plastic material in said mold with said wire reinforcement means surrounding the tube in the mold and free of engagement with said tube at portions corresponding to the helically corrugated interior wall of said mold; sealing off the interior of the tube from the interior of the mold; introducing fluid under pressure into said tube for the purposes of providing pressure to expand the tube radially; supplying heat to said tube to cause material of the expanded tube to flow around the turns of said reinforcement means into contact with the surrounding mold walls to assume the configuration of the mold; and supplying heat to cure the plastic material of the expanded tube.

2. A method as set forth in claim 1 in which the turns of the reinforcement means are formed to a diameter to seat in the valleys of the mold corrugations whereby the mold corrugations hold said turns in spaced positions prior to the expansion of the tube and whereby the turns of the reinforcement means are embedded in the crests of the corrugations of the finished hose.

3. A method of fabricating a helically corrugated hose of thermosetting plastic material with circumferential turns of wire reinforcement means embedded therein, said method being characterized by the use of a hollow mold with a helically corrugated interior circumferential wall and including the steps of: placing a tube of thermosetting plastic material inside the turns of said wire reinforcement means; placing the assembly of tube and wire reinforcement means in said mold with the internal surface of said turns of wire in radially spaced relation to the external surface of said tube and with the turns of said wire reinforcement means freely disposed within the helical corrugations of said mold; and with the interior of the tube sealed off from the interior of the mold, introducing fluid under pressure into said tube and also applying heat to said tube for the purposes of, first, expanding the tube radially outward thereby causing the plastic material to engage and flow around the turns of the reinforcement means to embed the reinforcement means, second, forming the assembly to the configuration of the interior of the mold, and third, at least partially curing the plastic material in the expanded configuration.

4. A method of fabricating a corrugated hose of thermosetting plastic material with circumferential turns of wire reinforcement means embedded therein and with an outer layer of sheet material incorporated in the hose structure, said method being characterized by the use of a hollow mold with a corrugated interior circumferential wall and including the steps of: placing a tube of thermosetting plastic material inside the turns of said wire reinforcement means; placing a sleeve of said outer layer of sheet material over the turns of the reinforcement means; placing the assembly of said inside tube, reinforcement means and outer sleeve in said mold with the internal surface of said turns of wire in radially spaced relation to the external surface of said tube and with said turns of the reinforcement means and the outer sleeve overlying said turns disposed within the interior corrugations of said mold wall while retaining the radially spaced relationship between said inside tube and the turns of said reinforcement means; and with the interior of the tube sealed off from the interior of the mold, introducing fluid under pressure into said tube while applying heat to said tube for the purposes of, first, expanding the tube radially outward thereby causing the plastic material to engage and flow around the turns of the reinforcement means to embed the reinforcement means, second, forcing said outer sleeve into the configuration of the surrounding mold wall, third, forming the assembly to the configuration of the interior of the mold, fourth, causing said plastic material to bond with said sleeve, and fifth, curing the plastic material in the expanded configuration.

5. A method as set forth in claim 3 in which reinforcing sheet material is placed around at least the ends of said tube before the assembly of tube and reinforcement means is placed in said mold.

6. A method as set forth in claim 5 in which said reinforcing sheet material is placed around at least the end turns of said wire reinforcement means and is provided with a tacky surface for adhesive engagement with both said tube and said wire reinforcement means to hold the wire reinforcement means in position on the tube in said mold prior to introduction of the fluid under pressure into said tube and the application of heat to said tube.

7. A method of fabricating a hose of thermosetting material with circumferential turns of wire reinforcement means embedded therein, said method being characterized by the use of hollow molds with helically corrugated interior circumferential walls and including the steps of: placing a tube of thermosetting plastic material in a first corrugated mold of smaller inside diameter than the desired diameter of the finished hose with the tube inside the turns of said wire reinforcement means and with the interior of the tube sealed off from the interior of the mold; introducing fluid into said tube under pressure to expand the tube radially against the surrounding walls of the mold; supplying heat to cause the plastic material to at least partially embed said turns and to partially cure the plastic material of the expanded tube sufficiently for the tube to maintain the expanded configuration when released from internal fluid pressure; removing the resulting expanded tube with encircling reinforcement from the corrugated mold; adding further uncured plastic material to the periphery of the tube to build up a thickness of the plastic material over the encircling reinforcement means; placing the built-up tube in a second mold similar to the first mold but of larger inside diameter than the first mold with the interior of the tube sealed off from the interior of the second mold; introducing fluid under pressure into the built-up tube in the second mold to expand the tube into intimate contact with the surrounding walls of the mold; and supplying heat to cure the plastic material of the built-up tube in the configuration of the interior of the second mold.

8. A method of fabricating a corrugated hose of thermosetting material with turns of wire reinforcement means embedded in the valleys of the corrugations, which method is characterized by the use of a hollow mold with a helically corrugated interior circumferential wall and includes the steps of: placing a tube of thermosetting plastic material in said mold with the interior of the tube sealed off from the interior of the mold; applying fluid pressure to the interior of the tube to expand the tube to the configuration of the mold; applying heat to cure the plastic material sufficiently to maintain said configuration when released from the mold; removing the resulting corrugated tube from the mold; placing said turns of the wire reinforcement means over the tube with the individual turns at the valleys of the corrugations and with the turns of the reinforcement separated by the crests of the corrugations building up the thickness of the corrugated tube by adding uncured plastic material to the periphery thereof to cover the turns of the reinforcement means; placing the reinforcement-encircled and thickened corrugated tube in a second mold having corrugations corresponding to the corrugations of the tube; applying fluid pressure to the interior of the tube to expand the tube to the configuration of the second mold; and applying heat to further cure the expanded plastic tube.

9. In apparatus of the character described for processing a tube of uncured thermosetting plastic material to form a tubular body, the combinattion of: a longitudinally split mold with an interior circumferential wall of the shape of the finished tubular body; and a mandrel to extend through the tube and initially support the tube in the mold, said mandrel having a central portion of a first diameter and having ends of a second diameter larger than said first diameter but less than the diameter of the cooperating portions of the mold, at least one of said ends being separable from the central portion to permit insertion of said mandrel into said tube, said mandrel having an opening extending exteriorly of said mold for the admission of fluid under pressure into the interior of said tube to expand the tube radially to the configuration of the mold, the ends of said mandrel being dimensioned to cooperate with the ends of said mandrel being dimensioned to cooperate with the ends of the tube in a fluid-tight manner to seal off the interior of the tube from the interior of the mold around the tube, said mandrel having a second opening spaced from said first mentioned opening and extending exteriorly of said mold for the discharge of fluid from the interior of the tube thereby to cause circulation of the fluid through the tube.

10. In apparatus of the character described for processing a hollow body of uncured plastic material to form a cured hollow body with turns of wire reinforcement embedded therein, the combination of: a hollow mold dimensioned and shaped for the cured body, said mold having a plurality of blade elements extending inward from its inner molding surfaces for engaging each of said turns at multiple points to hold the turns spaced inwardly from said inner molding surfaces; and mandrel means for insertion into said uncured body to cooperate with said mold to seal off the interior of the uncured body from the surrounding inner molding surfaces, said mandrel means having at least one opening to permit fluid under pressure to be admitted into the interior of said tube to expand the tube outward around said blade elements against said inner molding surfaces for heat curing of the plastic material in expanded state.

11. A method of fabricating a hose as set forth in claim 3 which includes the further steps of removing the partially cured material from the mold and subsequently subjecting the material to heat to complete the cure.

12. In apparatus of the character described for molding a tube of uncured thermosetting plastic material to form a plurality of integrally connected hose sections each comprising an intermediate internally and externally corrugated wall section disposed between smooth cylindrical end sections, the combination comprising a longitudinally split mold having an interior circumferential wall to enclose the uncured tube, said wall provided with a plurality of circumferentially corrugated sections disposed between substantially smooth cylindrical sections, a cylindrical section being disposed adjacent each mold end and a cylindrical section being disposed between adjacent corrugated sections; a mandrel to hold said tube in said mold, said mandrel having enlarged end portions adapted for insertion into the opposite ends of the tube, said portions being spaced apart and dimensioned to cooperate with respectively adjacent cylindrical end portions of the mold to grip the walls of the tube between the enlarged portions and the mold to seal off the interior of the tube from the interior of the mold around the tube, said mandrel having ta least one opening for introduction of fluid under pressure into said tube to expand the tube into molding pressure contact with the surrounding interior mold wall, said cylindrical mold portion intermediate said corrugated mold sections being of an axial length sufficient to provide cylindrical sections on the ends of respective hose sections when the integrally connected sections are severed intermediate the corrugated portions.

13. A method of fabricating a hose as set forth in claim 1 in which a coating of bonding material is applied to the turns of said wire reinforcing means before the tube and reinforcing means are placed in the mold, the coating on the wire presenting a surface highly wettable with respect to the plastic material and said plastic material having an affinity for the bonding material.

14. A method for the manufacture of reinforced helically corrugated hose which comprises placing in a hollow internally corrugated mold the components of said hose before said components are formed into a hose, said components comprising a tubular member of elastomeric material, and a reinforcing member having axially spaced turns whose interior diameter is greater than the exterior diameter of said tubular member, said reinforcing member being disposed in said mold surrounding said tubular member with the axially spaced turns of said reinforcing member in alignment with and freely positioned within the valleys of the corrugations of said mold in radially spaced relation to said tubular member, and uniting and forming said components into a hose by subjecting said tubular member to internal pressure accompanied by heating to cause it to expand and soften and conform to the shape of said mold while simultaneously flowing around and embedding said turns therein and to at least partially set the material of said tubular member.

15. A method according to claim 14 wherein the tubular member is composed of elastomeric material which, will go through a thermoplastic stage when heated and which further comprises the step of cooling said tubular member after said turns have become embedded therein.

16. A method according to claim 14 wherein the reinforcing member is a helical coil having spaced turns.

17. A method for the manufacture of spirally corrugated reinforced flexible hose which comprises forming an elongated tubular member of elastomeric material, forming an assembly by positioning over said member a plurality of separate longitudinally spaced reinforcing members each of which comprises a plurality of longitudinally spaced helical wire turns, each of said reinforcing members being spaced from the adjacent member by a predetermined distance corresponding to end collars of individual lengths of hose to be cut from said elongated member, positioning said tubular member and its superimposed reinforcement within a mold having a helically corrugated molding surface, expanding said tubular layer within said mold under heat and internal fluid pressure and causing said elastomeric material to flow around said reinforcing turns and into conformity with the inner surface of said mold to cause said turns to become embedded in said elastomeric material while at the same time forming inner corrugations corresponding to the convolutions of the helical turns and a smooth molded helically corrugated outer surface, continuing the application of heat and internal fluid pressure until the desired curing of the elastomeric material is effected, removing the elongated assembly from the mold, and cutting the resulting elongated member into individual hose segments at points intermediate the spaced reinforcing members.

References Cited by the Examiner
UNITED STATES PATENTS

| | | | |
|---|---|---|---|
| 132,006 | 10/72 | Harris | 154—8 |
| 1,201,502 | 10/16 | Roberts | 156—196 XR |
| 1,324,850 | 12/19 | Roberts. | |
| 2,002,896 | 5/35 | Kopetz | 154—7 |
| 2,143,960 | 1/39 | Stalter et al. | |
| 2,248,898 | 7/41 | Ross et al. | |
| 2,299,520 | 10/42 | Yant. | |
| 2,314,611 | 3/43 | Dreyer. | |
| 2,326,041 | 8/43 | Lavallee | 18—35 |
| 2,331,630 | 10/43 | Rempel | 18—35 |
| 2,490,513 | 12/49 | Dreyer. | |
| 2,641,302 | 6/53 | Martin et al. | 154—8 |
| 2,712,157 | 7/55 | Holte | 154—8 |
| 2,723,426 | 11/55 | Pelley | 154—8 |
| 2,740,427 | 4/56 | Swan | 138—56 |
| 2,766,806 | 10/56 | Rothermel et al. | 154—8 |
| 2,780,273 | 2/57 | Roberts | 154—5 |
| 2,780,274 | 2/57 | Roberts et al. | 154—8 |
| 2,782,803 | 2/57 | Rothermel et al. | 138—56 |
| 2,813,573 | 11/57 | Roberts. | |
| 2,830,081 | 11/57 | Roberts et al. | 154—8 |

FOREIGN PATENTS 652,810   5/51   Great Britain.

EARL M. BERGERT, *Primary Examiner.*

CARL F. KRAFFT, ALEXANDER WYMAN, R. LERBOWITZ, CHAS. R. HODGES, *Examiners.*